(12) United States Patent
Shani et al.

(10) Patent No.: US 10,356,039 B1
(45) Date of Patent: Jul. 16, 2019

(54) APPARATUS, COMPUTER PROGRAM, AND METHOD FOR UTILIZING A DATA STRUCTURE TO ACCESS FULLY QUALIFIED DOMAIN NAME INFORMATION

(71) Applicant: Amdocs Development Limited, Limassol (CY)

(72) Inventors: Omer Shani, Savyon (IL); Gregory Vortman, Petach Tiqwa (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 225 days.

(21) Appl. No.: 15/283,068

(22) Filed: Sep. 30, 2016

(51) Int. Cl.
*G06F 15/16* (2006.01)
*H04L 29/12* (2006.01)
*G06F 16/901* (2019.01)

(52) U.S. Cl.
CPC ...... *H04L 61/1511* (2013.01); *G06F 16/9017* (2019.01); *G06F 16/9027* (2019.01)

(58) Field of Classification Search
CPC ............. H04L 61/1511; H04L 61/2007; H04L 61/2015; H04L 61/103; H04L 61/2514; H04L 61/2076; H04L 61/20; H04L 61/6009; G06F 17/30961; G06F 17/30952
USPC ....................................................... 709/245
See application file for complete search history.

(56) References Cited

U.S. PATENT DOCUMENTS

| | | | |
|---|---|---|---|
| 7,406,306 B2 | 7/2008 | Gallant et al. | |
| 2007/0101437 A1* | 5/2007 | Yamamoto | G06F 21/6218 726/27 |
| 2008/0082648 A1* | 4/2008 | Ahmed | H04L 63/126 709/223 |
| 2010/0189103 A1 | 7/2010 | Bachmann et al. | |
| 2012/0143877 A1* | 6/2012 | Kumar | G06F 16/9014 707/747 |
| 2012/0278897 A1* | 11/2012 | Ang | H04L 61/2596 726/26 |
| 2012/0297007 A1* | 11/2012 | Burckart | H04L 67/02 709/208 |
| 2013/0060815 A1* | 3/2013 | Saeki | G06F 16/27 707/802 |
| 2015/0142832 A1 | 5/2015 | Pope et al. | |

(Continued)

FOREIGN PATENT DOCUMENTS

| | | |
|---|---|---|
| EP | 2311242 A2 | 4/2011 |
| EP | 2887620 A1 | 6/2015 |
| GB | 2503704 A | 1/2014 |

(Continued)

*Primary Examiner* — David R Lazaro
*Assistant Examiner* — Berhanu Shitayewoldetadik
(74) *Attorney, Agent, or Firm* — Zilka-Kotab, P.C.

(57) ABSTRACT

An apparatus, computer program, and method are provided for utilizing a data structure to access fully qualified domain name information. A data structure is stored including a plurality of pairs. Each pair has a first element including information associated with a fully qualified domain name, and a second element including a result of a hash function performed on the information associated with the fully qualified domain name. In use, the data structure is utilized to access the information associated with the fully qualified domain name of at least one of the pairs, based on the result of the hash function performed on the information associated with the fully qualified domain name.

12 Claims, 6 Drawing Sheets

(56) References Cited

U.S. PATENT DOCUMENTS

2015/0304194 A1 10/2015 Ghose et al.
2016/0197831 A1* 7/2016 De Foy ............... H04L 45/7453
　　　　　　　　　　　　　　　　　　　　370/392

FOREIGN PATENT DOCUMENTS

| WO | 2005011175 | A2 | 2/2005 |
| WO | 2010004411 | A2 | 1/2010 |
| WO | 2013163477 | A1 | 10/2013 |

* cited by examiner

APPARATUS, COMPUTER PROGRAM, AND METHOD FOR UTILIZING A DATA STRUCTURE TO ACCESS FULLY QUALIFIED DOMAIN NAME INFORMATION

FIELD OF THE INVENTION

The present invention relates to communication systems, and more particularly to tracking information during use of communication systems.

BACKGROUND

Modern communication protocols (specifically—Diameter) include origin-host, origin-realm, destination-realm and destination-host fields which may be used to indicate an origin in which the message was constructed and sent, as well as a destination. Additionally, the origin-host also appears in the session-ID field which identifies a series of sequential events representing a single user experience. These fields must be retained by the various components handling the events and the sessions, including on both client and server sides of the communication.

As an example, the Diameter protocol recommends the origin-host to be a Uniform Resource Identifier (URI), which makes its potential length at 4K bytes (although the protocol allows for up to 255 bytes). However, a size of 255 bytes can be extremely long to store for the multitude of sessions handled at any given time by the participant components. Further, these URIs are sent repeatedly in all events and sessions originating from a source, thus such long information repeats itself millions of times, inflating memory requirements considerably.

There is thus a need for addressing these and/or other issues associated with the prior art.

SUMMARY

An apparatus, computer program, and method are provided for utilizing a data structure to access fully qualified domain name information. A data structure is stored including a plurality of pairs. Each pair has a first element including information associated with a fully qualified domain name, and a second element including a result of a hash function performed on the information associated with the fully qualified domain name. In use, the data structure is utilized to access the information associated with the fully qualified domain name of at least one of the pairs, based on the result of the hash function performed on the information associated with the fully qualified domain name.

DETAILED DESCRIPTION

Figure 1:
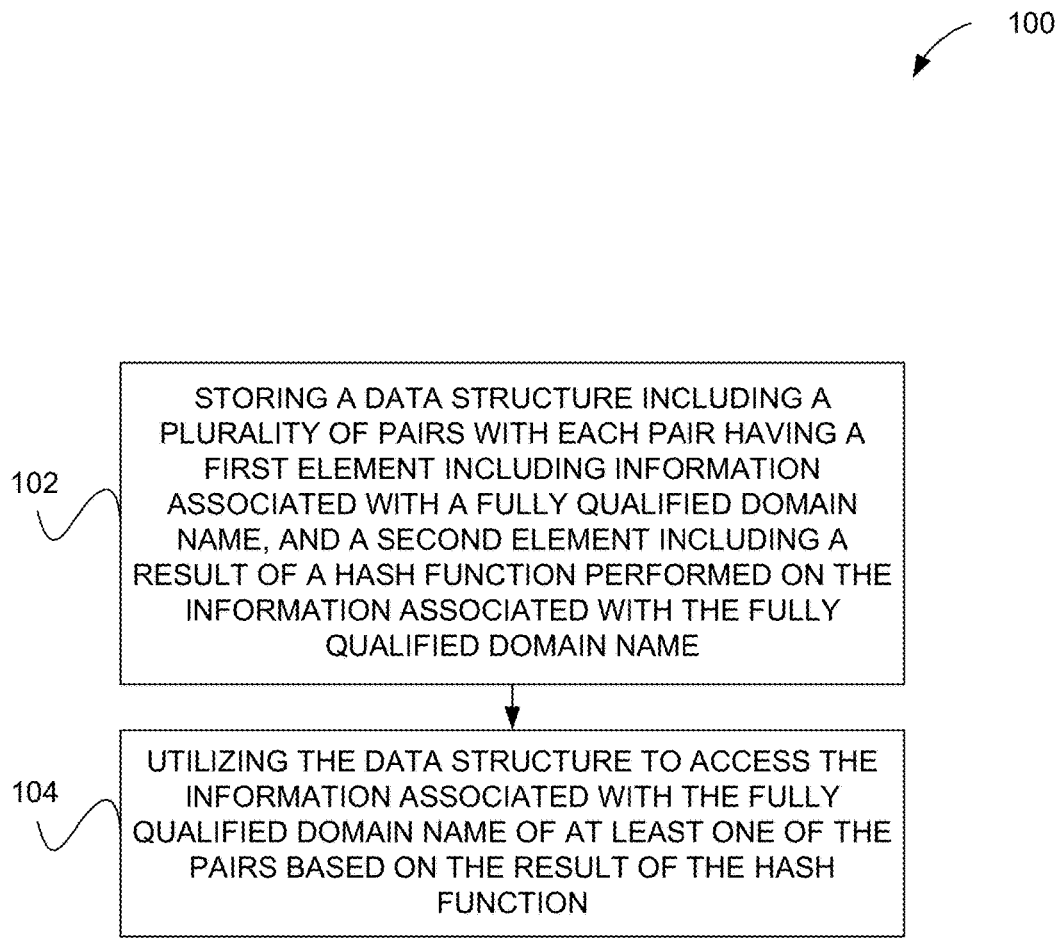
FIG. 1 illustrates a method for utilizing a data structure to access fully qualified domain name (FQDN) information, in accordance with one embodiment.

FIG. 1 illustrates a method 100 for utilizing a data structure to access fully qualified domain name (FQDN) information, in accordance with one embodiment. In the context of the present description, the FQDN includes a complete domain name for a specific computer, host, and/or any other device on the Internet. In one embodiment, the FQDN may include two parts: the hostname and the domain name. For example, a sample FQDN for a hypothetical mail server might be mymail.mycollege.edu. While FQDN information is set forth in the context of one embodiment, it should be noted that use of other information (relating to communication protocols and/or other environments) are contemplated, as well.

Still yet, the information associated with the FQDN may include any information that includes or describes any one or more components of the FQDN, or any information that is derived therefrom. For example, in one embodiment, the information may include an origin (e.g. origin host, origin domain, etc.), and/or a destination (e.g. destination host, destination domain, etc.). Still yet, in other embodiments, the information may be the result of processing. For example, in one embodiment, the information may include a uniform resource identifier (URI). Further, in another embodiment, the information may take the form of a session identifier.

Also in the context of the present description, the data structure may include any entity capable of being stored. For example, in one embodiment, the data structure includes a binary tree that may include any tree data structure in which each node has at most two children. In another embodiment, the data structure includes a look-up table which may include an array of elements that allows a value to be looked up using another value (e.g. a hashed resulting value, etc.). In any case, the data structure may, in various embodiments, include a plurality of pairs that each include two or more elements (e.g. portions, parts, components, etc.).

With reference to FIG. 1, the data structure is stored and includes a plurality of pairs, per operation 102. Further, each pair has a first element including information associated with a FQDN (hereinafter "FQDN information"). Still yet, each pair has a second element including a result of a hash function performed on the FQDN information of the first element (hereinafter "hashed FQDN information").

In the context of the present description, the aforementioned hash function may include any function that is operable for converting data of an arbitrary size to data of a lesser (and possibly a fixed) size. Thus, in various embodiments, the result of the hash function may include a hash value, hash code, hash sum, or simply a hash. Further, in different embodiments, the hash function may or may not include a trivial hash function, perfect hash function, minimal perfect hash function, rolling hash function, special-purpose hash function, multiplicative hash function, hash function using a nonlinear table look-up, and/or any other function that meets the above definition.

Still yet, in various embodiments, the data structure may be stored in memory. Such memory may be volatile or non-volatile, local or remote, or include any other memory capable of storing the data structure. Still yet, the data structure may be stored in structured (e.g. database, etc.) or non-structured memory. As a further option, the memory may be accessed by and/or the storage caused by at least one process that is in remote or local communication with the memory. More examples of possible memory and processors capable of use in storing the data structure will be set forth later during the description of subsequent embodiments. For reasons that will soon become apparent, one or more of the aforementioned components may be part of a communication system capable of sending and/or receiving messages (i.e. any data encapsulated using a desired communications protocol).

With continuing reference to FIG. 1, the data structure is utilized in operation 104 to access the FQDN information of at least one of the pairs. Further, this is accomplished based on the result of the hash function performed on the FQDN information. For example, in one embodiment, a hashed message component (e.g. origin, destination, etc.) may be used to look-up or otherwise obtain the message component (e.g. origin, destination, etc.) itself. As an option, the method 100 may or may not be used to avoid a need to compress the message component (e.g. origin, destination, etc.).

In one specific example of use in connection with a message being received (i.e. a message that is to be or already has been received), the same aforementioned hash function may be performed on the FQDN information of the message for determining whether the hashed FQDN information exists in the data structure. In one embodiment, such determination may be made to determine whether the above-mentioned data structure requires population or not. Specifically, the hashed FQDN information may be used as a key (e.g. second element of each pair) in a look-up table, and the value of the first element of the corresponding pair (i.e. the FQDN information) may be retrieved for inspection. Thus, if it is determined that the hashed FQDN information of the hash function does indeed exist in the data structure and the FQDN information matches, no such population is required and the FQDN information of the received message may simply be replaced with the hashed FQDN information.

In contrast, if it is determined that the hashed FQDN information of the hash function does not exist in the data structure, additional operations may or may not be performed to verify whether an error (albeit with low likelihood) has occurred. Specifically, another function may be performed on the FQDN information. In one embodiment, such another function may include an addition function (e.g. binary addition, etc.), but other embodiments are contemplated where such other function takes other forms that modify the FQDN information (hereinafter "modified FQDN information").

Once the FQDN information has been modified, an additional hash function (e.g. the same one performed referenced in operations 102/104) may be performed on the modified FQDN information to produce a result (hereinafter "hash/modified FQDN information"). To this end, it may be determined whether the hash/modified FQDN information exists in the data structure. If so, no population of the data structure is required.

On the other hand, if the hash/modified FQDN information does not exist in the data structure, such population may occur and, in order to flag the fact that the pair entry contains hash/modified FQDN information, a flag may be associated with in connection with the same. Such flagging may be accomplished in any desired manner. For example, in various embodiments, a flag may be linked to (or otherwise associated with) the corresponding pair entry in the data structure, be included in an additional field associated with the pair entry, etc. Again, in any case, the FQDN information of the received message may be replaced with the hashed FQDN information.

In another specific example of use in connection with a message being sent (i.e. a message that is to be or already has been sent), the aforementioned hashed FQDN information may be used to in a determination whether the hashed FQDN information exists in the data structure. Similar to the previous example of use, this may be accomplished by the hashed FQDN information being used as a key (e.g. second element of each pair) in a look-up table, and the value of the first element of the corresponding pair (i.e. the FQDN information) may be retrieved for inspection.

Specifically, in connection with the look-up, the FQDN information may be conditionally modified, based on whether the hashed FQDN information has a flag associated therewith. By this design, an appropriate version of the FQDN information may be used in connection with the message being sent.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 2:
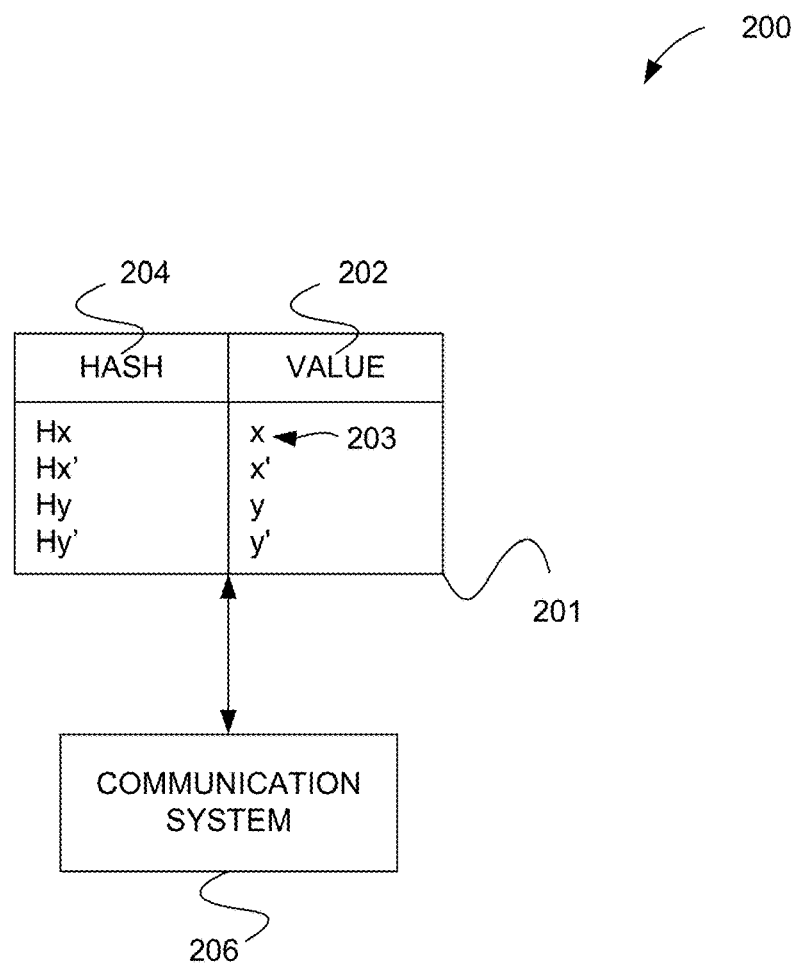
FIG. 2 illustrates a system for utilizing a data structure with a communication system, in accordance with one embodiment.

FIG. 2 illustrates a system 200 for utilizing a data structure with a communication system, in accordance with one embodiment. As an option, the system 200 may be implemented in the context of any one or more of the embodiments set forth in any previous and/or subsequent figure(s) and/or description thereof. However, it is to be appreciated that the system 200 may be implemented in the context of any desired environment.

As shown, the system 200 includes a look-up table 201 including a plurality of pairs 202 and hashes 204. The pairs 202 may include original field values and/or representation(s) of the original field value. In one embodiment, a representation of the original field value may include a prime value (e.g. x', y', etc.) of the original value, based on a result from an addition function (e.g. +1%, etc.). Such pairs 202, in turn, include FQDN information in the form of a plurality of origin values 203 (e.g. origin hosts/realms, etc.) associated with hashes 204 corresponding to the origin values 203. Of course, in other embodiments, the origin values 203 may be replaced and/or supplemented with other values (e.g. destination hosts/realms, etc.). Further, as an option, the use of the hashes 204 (and/or a shorter length thereof, as compared to that of the origin values 203) may result in an increased efficiency at a cost of a small chance (e.g. 1 out of $10^{18-20}$, etc.) of error (that the different origin values 203 produce the same hash 204).

Additionally, the hashes 204 may include a hash value (e.g. Hx, Hy, etc.) corresponding to an original value (e.g. x, y, etc.). Still yet, the hashes 204 may include a hash prime value (e.g. Hx', Hy', etc.) corresponding to a prime value (e.g. x', y', etc.). In one embodiment, the hashes 204 may each be a N-bit representation of an original value of the associated pair 202. In one embodiment, the hashes 204 may be used as a key in the look-up table. Additionally, if a hash value already exists (at the time of look-up), another hash may be computed and outputted to the look-up table.

As such, an original value (associated with pairs 202) and a result value (e.g. associated with the hashes 204) may be stored in the look-up table. In an alternative embodiment, a binary tree may be used in place of a look-up table. When storing a pair of original values and hashed result values, a hash index in an open hash table may be used for a fast, single-step search. In another embodiment, a binary tree may be used, which may be more memory efficient but may require an average of log-N comparisons.

The system 200 further includes a communication system 206 that accesses the look-up table 201 (either remotely or locally) for populating the look-up table 201 and then using the look-up table 201 converting for the hashes 204 to the origin values 203. In one embodiment, such communication system 206 may refer to any node in a network (e.g. the Internet, etc.) that utilizes a communication protocol that uses the origin values 203 in each message for message routing/identification purposes. For example, such origin values 203 in each message may be included in a header thereof.

In use, the look-up table 201 may be populated by the communication system 206 during the receipt of message. Specifically, upon message receipt, the communication system 206 may determine whether the origin values 203 of such received messages have already been stored populated in the look-up table 201, along with the corresponding hashes 204. Further, during population of the look-up table 201, additional operations may be performed to accommodate any chance of error, in accordance with the aforementioned embodiment. Also, in the context of message receipt, the communication system 206 may replace the origin value 203 of such received messages with the corresponding hashes 204.

Still yet, the communication system 206 may, in response to a message being sent, utilize the look-up table 201 for identifying the origin value 203 for the message being sent, utilizing the corresponding hashes 204. More information will now be set forth regarding various exemplary techniques for the communication system 206 to use the look-up table 201 during message receipt/transmission.

Figure 3:
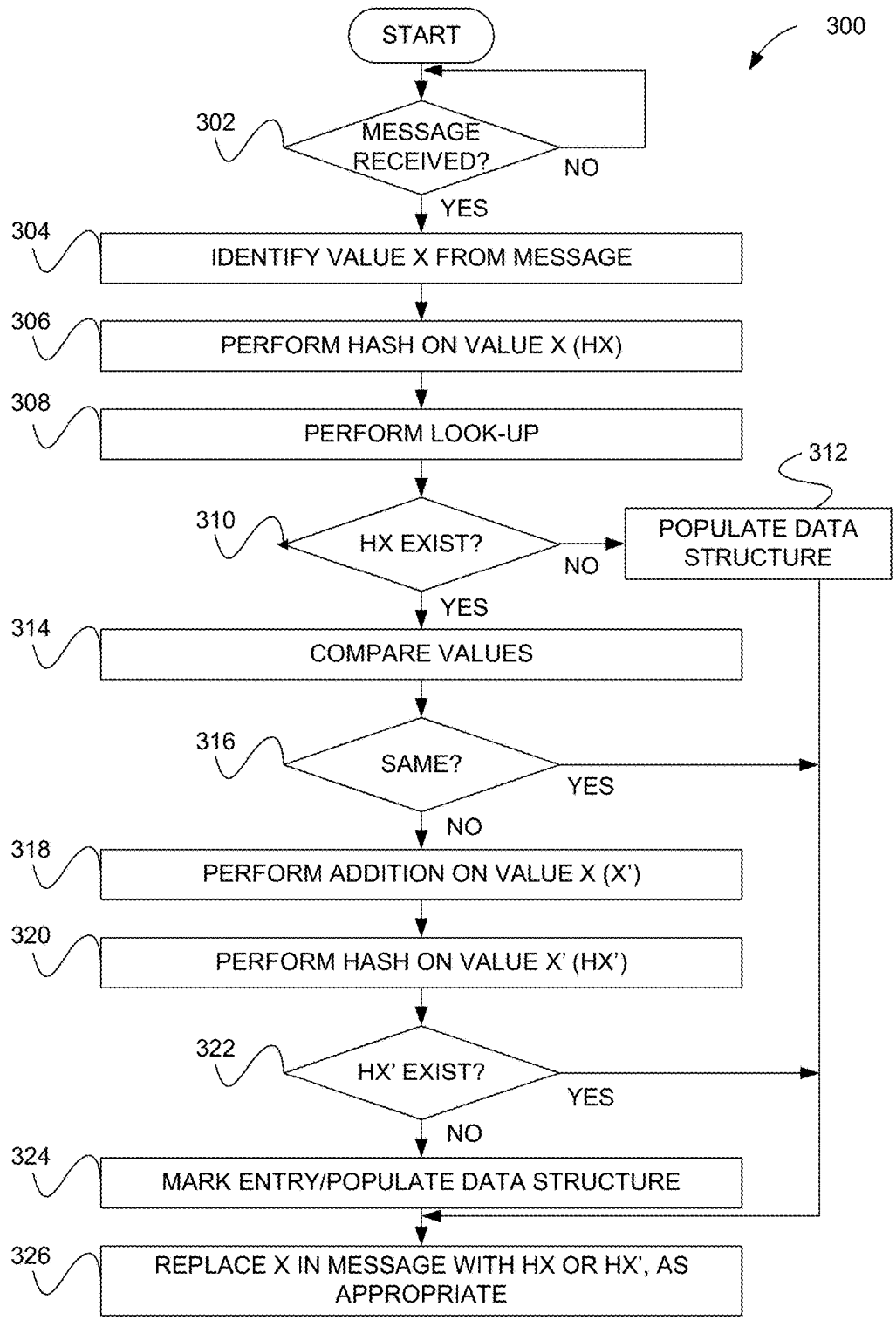
FIG. 3 illustrates a method for using a look-up table during message receipt, in accordance with one embodiment.

FIG. 3 illustrates a method 300 for using a look-up table during message receipt, in accordance with one embodiment. As an option, the method 300 may be implemented in the context of any one or more of the embodiments set forth in any previous and/or subsequent figure(s) and/or description thereof. For example, the method 300 of FIG. 3 may be implemented by the communication system 206 of FIG. 2, during message receipt. However, it is to be appreciated that the method 300 may be implemented in the context of any desired environment.

As shown, the method 300 begins with decision 302 of determining whether a message is received. If a message has not yet been received, then the method 300 loops until a message is received at decision 302. If a message has been received, then in operation 304, a value x from message is identified. As describe elsewhere herein, the value x may include any value associated with a field. Next, in operation 306, a hash is performed on value x, resulting in hash Hx. Based on hash Hx, a look-up is performed in operation 308.

In decision 310, it is determined whether Hx exists in a look-up table. If Hx does not exist, then in operation 312, a data structure is populated, resulting in operation 326 where x in the message is replaced with Hx' or Hx, as appropriate. In this embodiment, if Hx does not exist, then x in the message would be replaced with Hx.

With continuing reference to decision 310, if Hx does exist, then in operation 314, the values are compared. If it is determined that a pair is found using such result hash Hx as a key into the look-up table (per decision 310), additional operations may be performed to accommodate a possible error situation where two different values generate the same hash Hx. Specifically, it is determined whether a match occurs in connection with such pair. In one possible embodiment, this may be accomplished using a comparison between a value of such pair, and a value in the message. See operation 314. If they are the same, as determined in decision 316, then x in the message is replaced with Hx, per operation 326.

On the other hand, if the match does not occur per decision 316 (indicating an error situation), another function is performed in connection with the message. Specifically, in one possible embodiment, an addition function (e.g. +1%, etc.) is performed on the value x from the message, thus rendering a modified value x', per operation 318. In one embodiment, performing an addition function on the value x may cause the cell (e.g. in the look-up table) to include a flag (e.g. an addition notification, etc.), as will soon become apparent.

As mentioned earlier during the description of FIG. 2, such modification may be used to accommodate a situation where the hash function produced an error. To this end, the addition function may be particularly configured to check for such error possibility. Of course, other functions (e.g. another hash function, etc.) may be used, insofar as such criteria is met, such that when both the hash and the additional function is used, a chance of collision is eliminated.

With continuing reference to FIG. 3, a subsequent hash is performed on value x', as indicated in operation 320, resulting in Hx'. Next, it is determined in decision 322 whether Hx' exists in the look-up table. If it does exist, then x in the message is replaced with Hx', per operation 326. If Hx' does not exist, then in operation 324, the entry is marked, and the data structure is populated, resulting with x in the message being replaced with Hx', per operation 326.

Figure 4:
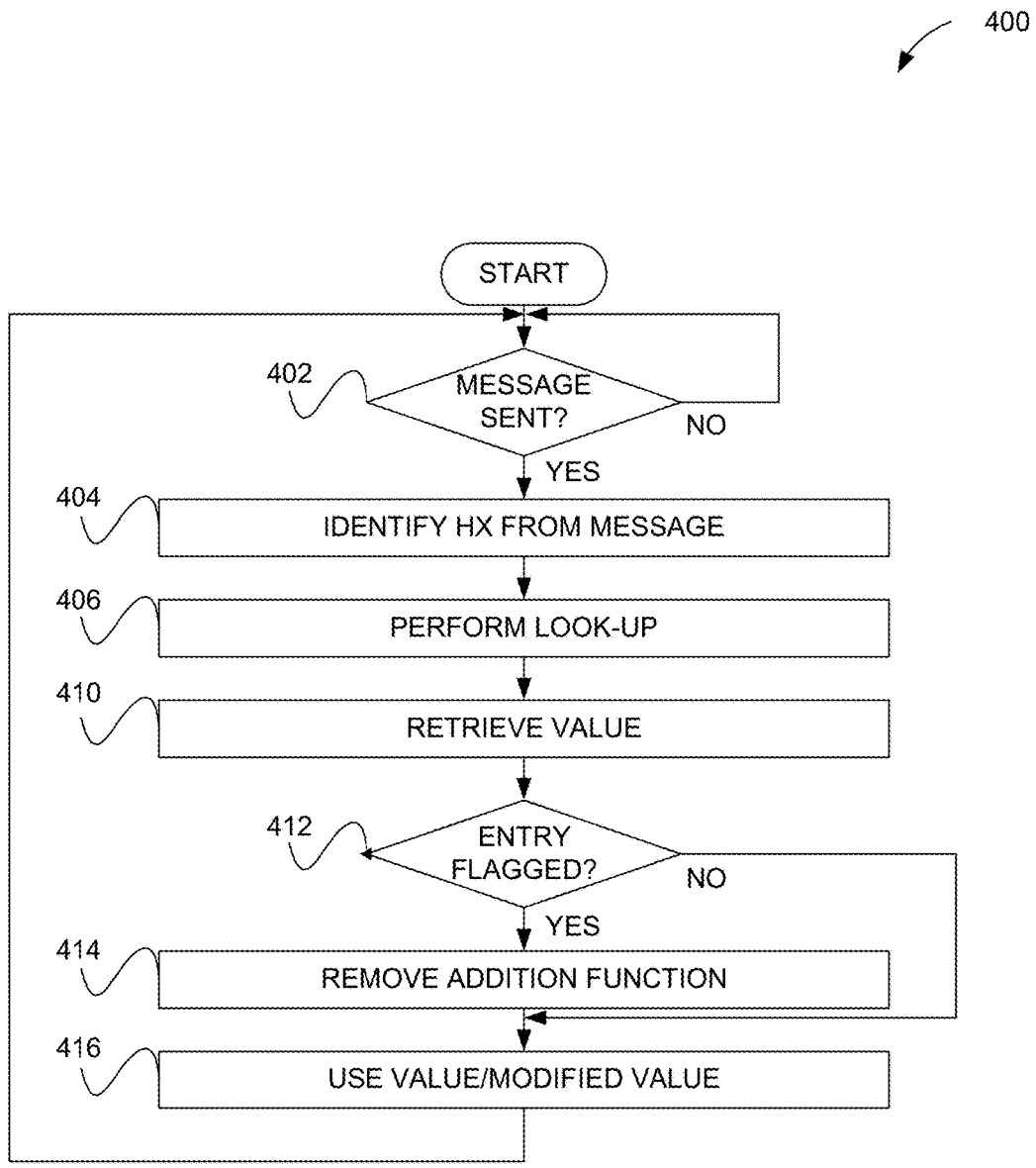
FIG. 4 illustrates a method for using a look-up table during message transmission, in accordance with one embodiment.

FIG. 4 illustrates a method 400 for using a look-up table during message transmission, in accordance with one embodiment. As an option, the method 400 may be implemented in the context of any one or more of the embodiments set forth in any previous and/or subsequent figure(s) and/or description thereof. For example, the method 400 of FIG. 3 may be implemented by the communication system 206 of FIG. 2, during message transmission (possibly following the method 300 of FIG. 3). However, it is to be appreciated that the method 400 may be implemented in the context of any desired environment.

As shown, the method 400 begins with decision 402 of determining whether a message was sent. If a message has not yet been sent, then the method 400 loops until a message is sent at decision 402. If a message has been sent, then in operation 404, a Hx from a message is identified. Using the Hx from the message, a look-up is performed in operation 406. In various embodiments, a look-up may occur using a look-up table, a binary tree, etc.

Next, a value (corresponding to the Hx, etc.) is retrieved. See operation 410. In decision 412, it is determined whether an entry is flagged. If an entry is flagged, then an addition function is removed in operation 414. Next, or if an entry is not flagged (per decision 412), then a value or modified value may be used in operation 416.

In this manner, method 400 effectively reverses the order of the steps associated with method 300.

Thus, the embodiments disclosed herein may be used in connection with various FQDN information used in different communication protocols. For example, a long string length (which may pose a problem if repetitive storage of the same values is required) may be compressed. Additionally, a number of unique values may be relatively small compared to the number of repetitions in which the values are used, which may also be relatively small compared to the number of possible values available in the compression.

In one embodiment, new compressed values may be created on an ad-hoc basis (as needed). Additionally, decompression may be required for any value which was previously compressed. As such, a system is provided where original strings are hashed into an N-bit value, and stored as pairs (origin, result) in a binary tree and/or an open hash table for the option of "decompressing" the result back to the origin value.

In some embodiments, a process to simplify and make unique reference names may create a long string (e.g. the URI) comprised of several names of nets and sub-nets, along with additional parameters identifying the named element. For example, a URI may be up to 4096 bytes (4K). Often, however, the part that is being used for naming (URN) does not exceed 255 bytes. Still, if even 255 bytes for a URN were repeated and stored a hundred million times a day, such could become a heavy burden on a storage system.

In one embodiment, identification of such strings (e.g. URN) may be required for the identification of, among many items, other identifiers, a message originating host, part of an identification of a session construed of several events, etc. In such an embodiment, a same signature name may be used. Again, identification, like repeating and storing of strings, may be a heavy burden on a storage system.

In view of such, a two-way compression for such names (e.g. URN) may relieve such a burden (e.g. on the storage system). Since the number of originating processes is very small compared with the number of messages sent by each of them, a look-up table may be used, where the original value and the representation of that value may be stored. Maintaining such a table on the fly, using the original value and the hashed value, along with an additional value for another hash function result, may be maintained in a simple fashion, and may be populated during the first occurrence of each origin-host.

In another embodiment, a look-up table may be created where an original value and a result compression are mathematically 'attached', and a calculation F where the original-value equals the result value may yield the same result. Such a compression may be dependent on use of a hashing function.

Since the values of the origin-hosts in a normal environment are fairly static, the chances of a collision (i.e. of an identical hashing result existing) are very low. It is possible, in case of a collision, to add an additional, or any number, of hashes (using another function) such that the combination (needed to be executed only in case of an identified collision) is, in effect, negligible.

As such, an origin value may be received of any length, which may be as long as desired. Such a value may be hashed into N-bit representation(s) of that original value. The hashed results may be used a key in a look-up table (or a binary tree), and the original result values may be stored in such a look-up table (or binary tree).

Figure 5:
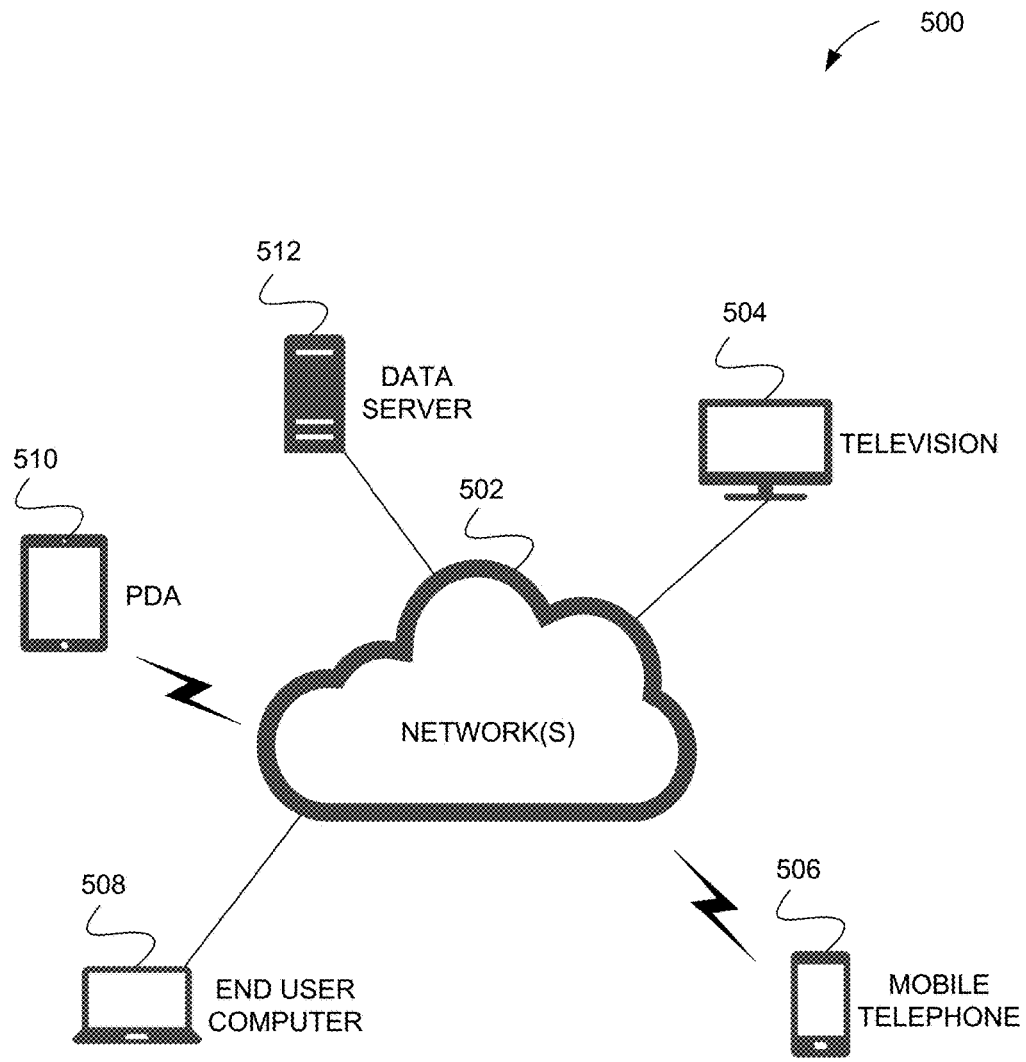
FIG. 5 illustrates a network architecture, in accordance with one possible embodiment.

FIG. 5 illustrates a network architecture 500, in accordance with one embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
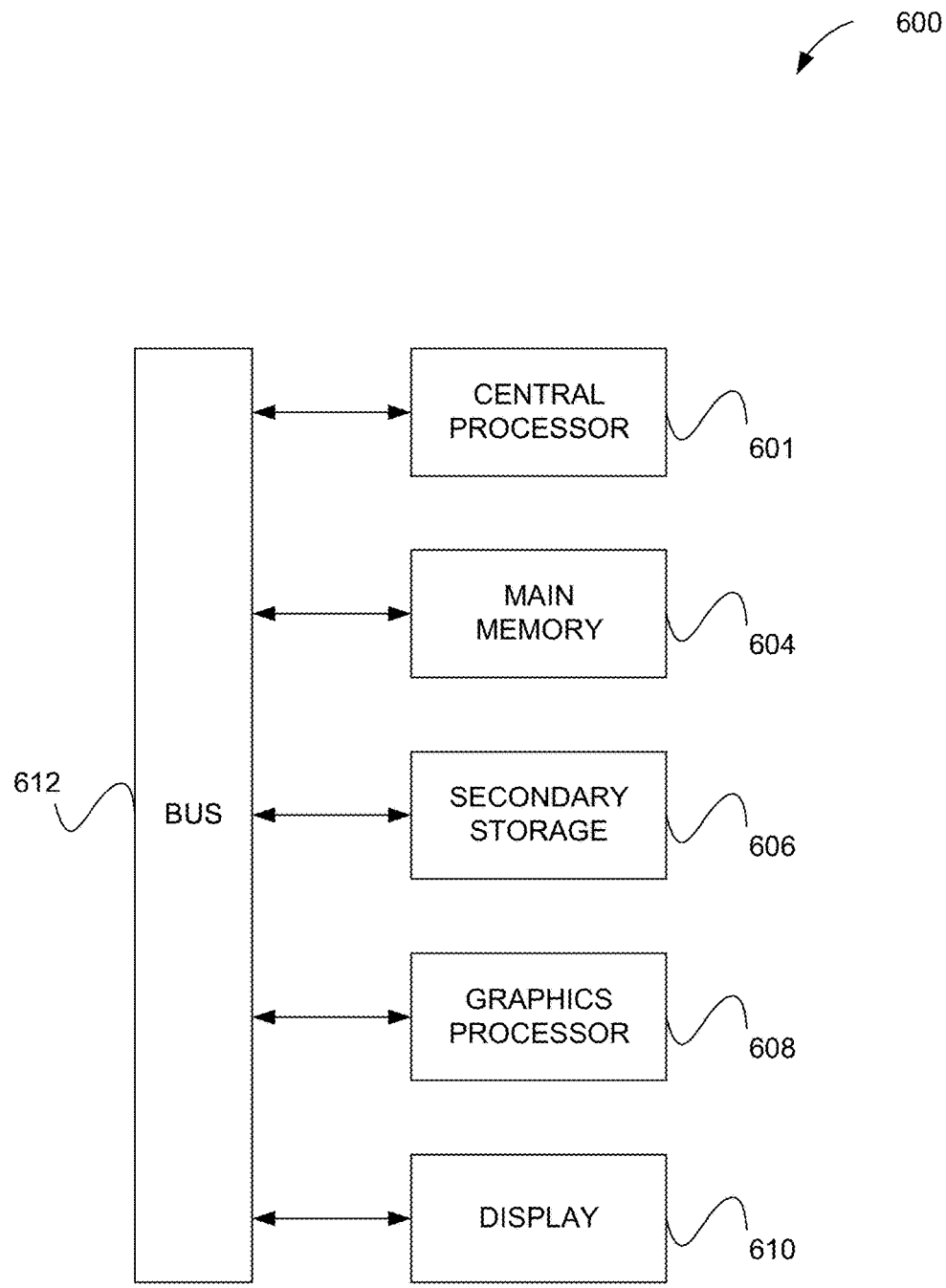
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. However, it is to be appreciated that the system 600 may be implemented in any desired environment.

As shown, a system 600 is provided including at least one central processor 602 which is connected to a bus 612. The system 600 also includes main memory 604 [e.g., hard disk drive, solid state drive, random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, secondary storage 606 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor of a communication system instruct the processor to:
    access, in memory, a data structure that includes a plurality of element pairs, each element pair having:
        a first element storing information associated with a fully qualified domain name, and
        a second element storing a hash resulting from a hash function performed on the information associated with the fully qualified domain name, wherein a size of the hash is smaller than a size of the information associated with the fully qualified domain name;
    receive a message having a value;
    hash the value to determine a particular hash for the message;
    retrieve one of the element pairs from the memory that includes a hash matching the particular hash determined for the message;
    identify a value of the first element from the retrieved element pair;
    determine that the value of the first element matches the value in the message;
    replace the value in the message with the particular hash determined for the message for increasing an efficiency associated with the message; and
    use the value of the first element for message routing.

2. The computer program product of claim 1, wherein the data structure includes a look-up table.

3. The computer program product of claim 1, wherein the data structure includes a binary tree.

4. The computer program product of claim 1, wherein the information associated with the fully qualified domain name, includes one or more components of the fully qualified domain name itself.

5. The computer program product of claim 1, wherein the information associated with the fully qualified domain name includes an origin.

6. The computer program product of claim 5, wherein the origin includes at least one of an origin host or an origin domain.

7. The computer program product of claim 1, wherein the information associated with the fully qualified domain name includes a uniform resource identifier (URI).

8. The computer program product of claim 1, wherein the executable instructions stored on the non-transitory computer readable medium, when executed by the processor of the communication system, further instruct the processor to:
   receive a second message having a second value;
   hash the second value to determine a particular second hash for the second message;
   determine that none of the element pairs from the memory include a hash matching the particular second hash determined for the second message;
   responsive to determining that none of the element pairs from the memory include a hash matching the particular second hash determined for the second message, modify the second value using a predefined function;
   hash the modified second value to determine a particular modified second hash for the second message;
   determine that one of the element pairs from the memory includes a hash matching the particular modified second hash determined for the second message;
   responsive to determining that one of the element pairs from the memory includes a hash matching the particular modified second hash determined for the second message:
      replace the second value in the second message with the particular modified second hash determined for the second message; and
      use the second value for message routing.

9. The computer program product of claim 1, wherein the data structure is populated for received messages having values without a corresponding hash in the data structure.

10. The computer program product of claim 1, wherein the executable instructions stored on the non-transitory computer readable medium, when executed by the processor of the communication system, further instruct the processor to:
   determine that a second message has been sent;
   identify a hash from the second message;
   determine that one of the element pairs from the memory includes a hash matching the hash determined for the second message;
   retrieve a value from the one of the element pairs determined to include a hash matching the hash determined for the second message;
   wherein the retrieved value is utilized for message routing.

11. A method, comprising:
   accessing, in memory by a processor of a communication system, a data structure that includes a plurality of element pairs, each element pair having:
      a first element storing information associated with a fully qualified domain name, and
      a second element storing a hash resulting from a hash function performed on the information associated with the fully qualified domain name, wherein a size of the hash is smaller than a size of the information associated with the fully qualified domain name;
   receiving, by the processor, a message having a value;
   hashing, by the processor, the value to determine a particular hash for the message;
   retrieving, by the processor, one of the element pairs from the memory that includes a hash matching the particular hash determined for the message;
   identifying, by the processor, a value of the first element from the retrieved element pair;
   determining, by the processor, that the value of the first element matches the value in the message;
   replacing, by the processor, the value in the message with the particular hash determined for the message for increasing an efficiency associated with the message; and
   using, by the processor, the value of the first element for message routing.

12. An apparatus, comprising:
   at least one processor of a communication system configured for:
   accessing, in memory by the processor of the communication system, a data structure that includes a plurality of element pairs, each element pair having:
      a first element storing information associated with a fully qualified domain name, and
      a second element storing a hash resulting from a hash function performed on the information associated with the fully qualified domain name, wherein a size of the hash is smaller than a size of the information associated with the fully qualified domain name;
   receiving, by the processor, a message having a value;
   hashing, by the processor, the value to determine a particular hash for the message;
   retrieving, by the processor, one of the element pairs from the memory that includes a hash matching the particular hash determined for the message;
   identifying, by the processor, a value of the first element from the retrieved element pair;
   determining, by the processor, that the value of the first element matches the value in the message;
   replacing, by the processor, the value in the message with the particular hash determined for the message for increasing an efficiency associated with the message; and
   using, by the processor, the value of the first element for message routing.

* * * * *